(12) United States Patent
LaBuda et al.

(10) Patent No.: US 7,717,981 B2
(45) Date of Patent: May 18, 2010

(54) PERFORMANCE STABILITY IN SHALLOW BEDS IN PRESSURE SWING ADSORPTION SYSTEMS

(75) Inventors: Matthew James LaBuda, Fogelsville, PA (US); Timothy Christopher Golden, Allentown, PA (US); Roger Dean Whitley, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 530 days.

(21) Appl. No.: 11/542,948

(22) Filed: Oct. 4, 2006

(65) Prior Publication Data
US 2008/0083332 A1 Apr. 10, 2008

(51) Int. Cl.
*B01D 53/02* (2006.01)
(52) U.S. Cl. .......... 95/96; 95/130; 128/205.12
(58) Field of Classification Search ......... 95/96, 95/130; 128/205.12
See application file for complete search history.

(56) References Cited

U.S. PATENT DOCUMENTS

| | | | |
|---|---|---|---|
| 4,222,750 A * | 9/1980 | Gauthier et al. | 95/102 |
| 4,406,675 A | 9/1983 | Dangieri et al. | |
| 4,477,264 A | 10/1984 | Kratz et al. | |
| 4,711,645 A | 12/1987 | Kumar | |
| 4,964,888 A | 10/1990 | Miller | |
| 5,071,449 A | 12/1991 | Sircar | |
| 5,258,060 A | 11/1993 | Gaffney et al. | |
| 6,238,460 B1 | 5/2001 | Deng et al. | |
| 6,551,384 B1 | 4/2003 | Ackley et al. | |
| 6,797,854 B1 | 9/2004 | Jochem | |
| 6,824,590 B2 | 11/2004 | Dee et al. | |
| 2002/0014159 A1 | 2/2002 | Tatsumi et al. | |

(Continued)

FOREIGN PATENT DOCUMENTS

EP 0 391 718 A 10/1990

(Continued)

OTHER PUBLICATIONS

Sircar, Shivaji, et al., "Drying of Gases and Liquids by Activated Alumina", Adsorption on New and Modified Inorganic Solvents, Elsevier Science B.V., 1996, pp. 629-646; vol. 99.

(Continued)

*Primary Examiner*—Robert A Hopkins
(74) *Attorney, Agent, or Firm*—John M. Fernbacher; Anne B. Kiernan

(57) ABSTRACT

PSA process for oxygen production comprising (a) providing an adsorber having a first layer of adsorbent selective for water and a second layer of adsorbent selective for nitrogen, wherein the heat of adsorption of water on the adsorbent in the first layer is ≦about 14 kcal/mole at water loadings ≧about 0.05 to about 3 mmol per gram; (b) passing a feed gas comprising at least oxygen, nitrogen, and water successively through the first and second layers, adsorbing water in the first layer of adsorbent, and adsorbing nitrogen in the second layer of adsorbent, wherein the mass transfer coefficient of water in the first layer is in the range of about 125 to about 400 $\sec^{-1}$ and the superficial contact time of the feed gas in the first layer is between about 0.08 and about 0.50 sec; and (c) withdrawing a product enriched in oxygen from the adsorber.

31 Claims, 4 Drawing Sheets

U.S. PATENT DOCUMENTS

2002/0134246 A1     9/2002    Babicki et al.
2004/0261618 A1    12/2004    Babicki et al.

FOREIGN PATENT DOCUMENTS

| EP | 0 449 576 A1 | 10/1991 |
|----|--------------|---------|
| EP | 1 598 103 A2 | 11/2005 |
| JP | 62235201 | 10/1987 |
| JP | 03052615 | 3/1991 |
| JP | 10152305 | 6/1998 |
| JP | 11197435 | 7/1999 |
| JP | 2002001113 | 1/2002 |

OTHER PUBLICATIONS

Ruthven, Douglas M., "Principles of Adsorption and Adsorption Process", John Wiley & Sons., Inc., 1984, pp. 217-218.

Wilson, Simon J., et al., "The Effects of a Readily Adsorbed Trace Component (Water) in a Bulk Separation PSA Process: The Case of Oxygen VSA", Ind. Eng. Chem. Res. 2001, vol. 40, No. 12, pp. 2702-2713.

Avgul, N., et al., "Molecular Sieve Zeolites—II" Heats of Adsorption on X-Type Zeolites Containing Different Alkali Metal Cations, American Chemistry Society Advances in Chemistry, Series 102, 1971, pp. 184-192.

Vasl'Eva, E.A., et al., "Zeolites of Adsorption of CO2 and NH3 on Synthetic Zeolites of Different Strucural Types", 1985 Plenum Publishing Corporation, pp. 1768-1772.

Yang, Ralph T., et al., "Gas Separation by Adsorption Processes", 1997 Imperial College Press, pp. 125-136.

Alpay, E., et al., "Adsorbent Particle Size Effects In The Separation Of Air By Rapid Pressure Swing Adsorption", Chemical Engineering Science, vol. 49, No. 18, 1994, pp. 3059-3075.

Pritchard, C.L., et al., "Design Of An Oxygen Concentrator Using Ther Rapid Pressure Swing Adsorption Principle", Chemical Engineering Res. Des., vol. 64, Nov. 1986; pp. 467-472.

Welty, et al., "Fundamentals of Momentum, Heat and Mass Transfer", 1989, Wiley and Sons, pp. 228.

Perry, et al., "Perry's Chemical Engineer's Handbook", 7th Edition McGraw Hill, 1997, pp. 5-12-51-16.

\* cited by examiner

PERFORMANCE STABILITY IN SHALLOW BEDS IN PRESSURE SWING ADSORPTION SYSTEMS

BACKGROUND OF THE INVENTION

Recent advances in process and adsorbent technology have enabled traditional large-scale pressure swing adsorption (PSA) systems to be scaled down to much smaller systems that operate in rapid cycles of very short duration. These small, rapid-cycle PSA systems may be utilized, for example, in portable medical oxygen concentrators that recover oxygen from ambient air. As the market for these concentrators grows, there is an incentive to develop increasingly smaller, lighter, and more portable units for the benefit of patients on oxygen therapy.

The impact of feed gas impurities on the adsorbent is a generic problem in many PSA systems, and the impact is especially serious in the small adsorbent beds required in small rapid-cycle PSA systems. For example, the water and carbon dioxide impurities in air can cause a significant decline in the performance of small PSA air separation systems by progressive deactivation of the adsorbent due to adsorbed impurities that are incompletely removed during regeneration steps of the PSA cycle. Because of this progressive deactivation, oxygen recovery will decline over time and adsorbent replacement may be required on a regular basis. Alternatively, the adsorbent beds may have to be oversized to account for progressive adsorbent deactivation. Both of these situations are undesirable because they increase the cost and weight of the oxygen concentrator system.

There is a need in the art for improved methods to remove impurities, particularly water, in the design and operation of small, portable, rapid-cycle PSA oxygen concentrators. This need is addressed by the embodiments of the invention described below and defined by the claims that follow.

BRIEF SUMMARY OF THE INVENTION

A first embodiment of the invention includes a pressure swing adsorption process for the production of oxygen comprising (a) providing at least one adsorber vessel having a feed end and a product end, wherein the vessel comprises a first layer of adsorbent material adjacent the feed end and a second layer of adsorbent material disposed between the first layer and the product end, wherein the adsorbent in the first layer is selective for the adsorption of water from a mixture comprising water, oxygen, and nitrogen and the adsorbent in the second layer is selective for the adsorption of nitrogen from a mixture comprising oxygen and nitrogen, and wherein the heat of adsorption of water on the adsorbent material in the first layer is equal to or less than about 14 kcal/mole at loadings equal to or greater than about 0.05 to about 3 mmol adsorbed water per gram of adsorbent;

(b) introducing a pressurized feed gas comprising at least oxygen, nitrogen, and water into the feed end of the adsorber vessel, passing the gas successively through the first and second layers, adsorbing at least a portion of the water in the adsorbent material in the first layer, and adsorbing at least a portion of the nitrogen in the adsorbent material in the second layer, wherein the mass transfer coefficient of water in the first layer of adsorbent material is in the range of about 125 to about 400 sec$^{-1}$ and the superficial contact time of the pressurized feed gas in the first layer is between about 0.08 and about 0.50 sec; and (c) withdrawing a product gas enriched in oxygen from the product end of the adsorber vessel.

The adsorbent material in the first layer may comprise activated alumina; the activated alumina may have an average particle diameter between about 0.3 mm and about 0.7 mm. The adsorbent material in the second layer may be selective for the adsorption of argon from a mixture comprising argon and oxygen. The concentration of oxygen in the product gas withdrawn from the product end of the adsorber vessel may be at least 85 volume %. The pressurized feed gas may be air.

The depth of the first layer may be between about 10% and about 40% of the total depth of the first and second layers, and the depth of the first layer may be between about 0.7 and about 13 cm. The adsorber vessel may be cylindrical and the ratio of the total depth of the first and second layers to the inside diameter of the adsorber vessel may be between about 1.8 and about 6.0.

The pressure swing adsorption process may be operated in a repeating cycle comprising at least a feed step wherein the pressurized feed gas is introduced into the feed end of the adsorber vessel and the product gas enriched in oxygen is withdrawn from the product end of the adsorber vessel, a depressurization step in which gas is withdrawn from the feed end of the adsorber vessel to regenerate the adsorbent material in the first and second layers, and a repressurization step in which the adsorber vessel is pressurized by introducing one or more repressurization gases into the adsorber vessel, and wherein the duration of the feed step is between about 0.75 and about 45 seconds. The total duration of the cycle may be between about 6 and about 100 seconds. The flow rate of the product gas enriched in oxygen may be between about 0.1 and about 3.0 standard liters per minute.

The ratio of the weight in grams of the adsorbent material in the first layer to the flow rate of the product gas in standard liters per minute at 93% oxygen purity in the product gas may be less than about 50 g/slpm. The amount of oxygen recovered in the product gas at 93% oxygen purity in the product gas may be greater than about 35% of the amount of oxygen in the pressurized feed gas.

The adsorbent material in the second layer may comprise one or more adsorbents selected from the group consisting of X-type zeolite, A-type zeolite, Y-type zeolite, chabazite, mordenite, and clinoptilolite. This adsorbent material may be a lithium-exchanged low silica X-type zeolite in which at least about 85% of the active site cations are lithium.

Another embodiment of the invention relates to a pressure swing adsorption process for the production of oxygen comprising (a) providing at least one adsorber vessel having a feed end and a product end, wherein the vessel comprises a first layer of adsorbent material adjacent the feed end and a second layer of adsorbent material disposed between the first layer and the product end, wherein the adsorbent in the first layer is selective for the adsorption of water from a mixture comprising water, oxygen, and nitrogen and the adsorbent in the second layer is selective for the adsorption of nitrogen from a mixture comprising oxygen and nitrogen, wherein the heat of adsorption of water on the adsorbent material in the first layer is equal to or less than about 14 kcal/mole at loadings equal to or greater than about 0.05 to about 3 mmol adsorbed water per gram of adsorbent;

(b) introducing a pressurized feed gas comprising at least oxygen, nitrogen, and water into the feed end of the adsorber vessel, passing the gas successively through the first and second layers, adsorbing at least a portion of the water in the adsorbent material in the first layer, and adsorbing at least a portion of the nitrogen in the adsorbent material in the second layer, wherein the mass transfer coefficient of water in the first layer of adsorbent material is in the range of about 125 to about 400 sec$^{-1}$; and (c) withdrawing a product gas enriched in oxygen from the product end of the adsorber vessel, wherein the ratio of the weight in grams of the adsorbent material in the first layer to the flow rate of the product gas in standard liters per minute at 93% oxygen purity in the product gas is less than about 50 g/slpm.

The adsorbent material in the first layer may comprise activated alumina; the activated alumina may have an average particle diameter between about 0.3 mm and about 0.7 mm. The adsorbent material in the second layer may be selective for the adsorption of argon from a mixture comprising argon and oxygen. The concentration of oxygen in the product gas withdrawn from the product end of the adsorber vessel may be at least 93 volume %. The pressurized feed gas may be air.

The depth of the first layer may be between about 10% and about 40% of the total depth of the first and second layers; the depth of the first layer may be between about 0.7 and about 13 cm. The adsorber vessel may be cylindrical and the ratio of the total depth of the first and second layers to the inside diameter of the adsorber vessel is between about 1.8 and about 6.0.

The pressure swing adsorption process may be operated in a repeating cycle comprising at least a feed step wherein the pressurized feed gas is introduced into the feed end of the adsorber vessel and the product gas enriched in oxygen is withdrawn from the product end of the adsorber vessel, a depressurization step in which gas is withdrawn from the feed end of the adsorber vessel to regenerate the adsorbent material in the first and second layers, and a repressurization step in which the adsorber vessel is pressurized by introducing one or more repressurization gases into the adsorber vessel, and wherein the duration of the feed step is between about 0.75 and about 45 seconds.

The total duration of the cycle may be between about 6 and about 100 seconds. The flow rate of the product gas enriched in oxygen may be between about 0.1 and about 3.0 standard liters per minute. The amount of oxygen recovered in the product gas at 93% oxygen purity in the product may be greater than about 35% of the amount of oxygen in the pressurized feed gas. The adsorbent material in the second layer may comprise one or more adsorbents selected from the group consisting of X-type zeolite, A-type zeolite, Y-type zeolite, chabazite, mordenite, and clinoptilolite. This adsorbent material may be a lithium-exchanged low silica X-type zeolite in which at least about 85% of the active site cations are lithium.

DETAILED DESCRIPTION OF THE INVENTION

Figure 1:
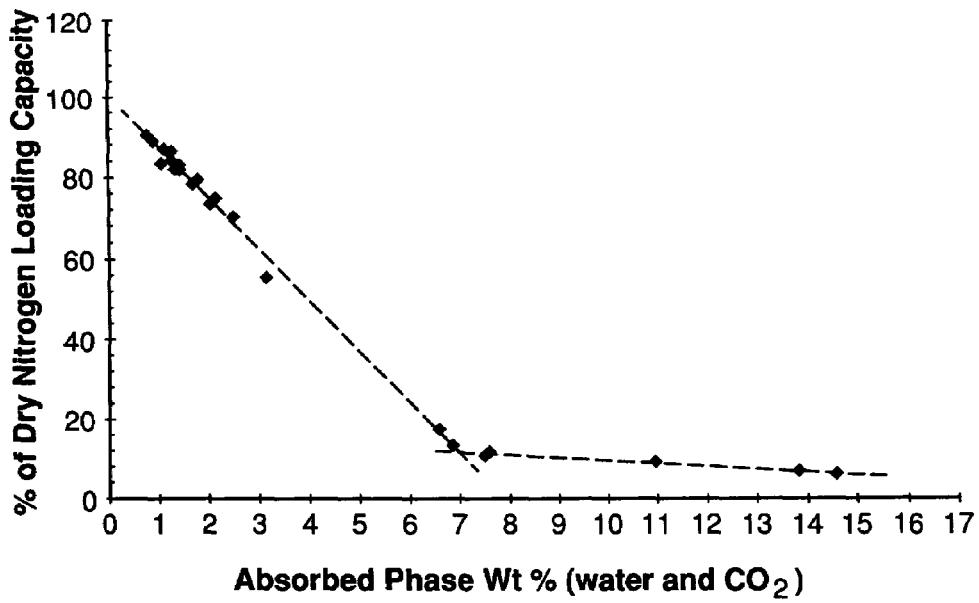
FIG. 1 is a plot of dry nitrogen capacity vs. adsorbed phase wt % (water and $CO_2$) on Li X zeolite.

Recent advances in process and adsorbent technology allow the designs of traditional large-scale pressure swing adsorption (PSA) processes to be scaled down to much smaller systems. These smaller systems are especially useful in transportable devices such as, for example, medical oxygen concentrators for recovering oxygen from air. As the medical oxygen concentrator market develops, there is a growing need for smaller, lighter, and more transportable devices for the benefit of patients requiring oxygen therapy.

The zeolite adsorbents commonly used as the nitrogen-selective adsorbents in oxygen PSA systems are sensitive to contaminants present in ambient air, specifically water and carbon dioxide, with water being the most serious and controlling contaminant. The nitrogen-selective zeolite adsorbents have a high affinity for these impurities, and rapid deactivation can occur when the impurities are not adequately removed during the regeneration steps of the PSA process. Numerous techniques have been used in the art to remove these impurities from the feed gas. In single or multiple bed systems, it is common to layer adsorbents in a vessel wherein a pretreatment layer of impurity-selective adsorbent is used at the feed inlet followed by one or more layers of nitrogen-selective adsorbent. The purpose of the impurity-selective pretreatment adsorbent is to reduce or remove water and/or carbon dioxide to protect the downstream adsorbent from progressive deactivation.

The impact of impurities on the performance of the nitrogen-selective adsorbent is much greater in the small PSA systems used for portable oxygen concentrators than in larger industrial PSA systems. If the impurities are not removed properly in small PSA systems, the impurities can progress through the nitrogen adsorbent beds and cause a slow decline in the performance of the PSA system over a long period of time. Although the contaminants may be removed by the pretreatment layer during the PSA feed step, inadequate regeneration of this layer during the purge step can occur and lead to the slow deactivation of the nitrogen adsorbent. Solutions to this problem are provided by the embodiments of the invention described below.

The generic term "pressure swing adsorption" (PSA) as used herein applies to all adsorptive separation systems operating between a maximum and a minimum pressure. The maximum pressure typically is superatmospheric, and the minimum pressure may be super-atmospheric or sub-atmospheric. When the minimum pressure is sub-atmospheric and the maximum pressure is superatmospheric, the system typically is described as a pressure vacuum swing adsorption (PVSA) system. When the maximum pressure is at or below atmospheric pressure and the minimum pressure is below atmospheric pressure, the system is typically described as a vacuum swing adsorption (VSA) system.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

Modern portable oxygen concentrators utilize PSA systems and are battery-powered to allow ambulatory patients to move about independently for reasonable periods of time without requiring connection to a power source. Light weight is critical for the successful development and use of these oxygen concentrators, and important design factors to achieve this include advanced adsorbent materials, small scale compressor technology, improved battery chemistry, lightweight materials of construction, new valve technology, scaled-down electronic components, and improved conserver devices. In addition, the proper choice of PSA cycles and adsorbents can significantly improve oxygen recovery, thereby reducing the weight of the adsorbent and the batteries required to operate the system.

For any PSA process, recovery improvements can be realized by utilizing a rapid cycles with adsorbent materials having favorable adsorption capacity and kinetic properties. In rapid cycle processes, adsorption kinetics is an important factor in reducing the size of adsorbent beds. As described above, an adsorbent bed may comprise a pretreatment zone in which feed contaminants of varying concentrations are removed and a main adsorbent zone which the main separation takes place. In PSA oxygen concentrators, the contaminants typically include water, $CO_2$, amines, sulfur oxides, nitrogen oxides, and trace hydrocarbons. The main separation is effected by adsorbing nitrogen on a nitrogen-selective adsorbent.

Because nitrogen-selective adsorbents have a high adsorption affinity for these contaminants, the adsorbed contaminants are difficult to remove once they are adsorbed. This adversely impacts the efficiency of the nitrogen/oxygen separation in an oxygen PSA system in which contaminants are removed by a pretreatment adsorbent that is regenerated by purging. The embodiments of the present invention are directed towards reducing the quantity of adsorbent in the pretreatment layer while maintaining the performance of the nitrogen-selective adsorbent under varied ambient operating conditions. The importance of proper feed gas pretreatment is illustrated in FIG. 1, which is a plot of dry nitrogen adsorption capacity vs. adsorbed phase wt % (water and $CO_2$) on LiX zeolite. It is seen that significant degradation of the nitrogen-selective equilibrium adsorbent capacity occurs at low levels of adsorbed water and $CO_2$.

Water vapor is the critical feed contaminant in PSA systems for recovering oxygen from ambient air. Nitrogen-selective adsorbents such as X-type zeolites and low silica zeolites containing lithium strongly adsorb water and require high activation energy to remove adsorbed water in regeneration. Water contamination on zeolites used in PSA air separation causes significant reduction in the nitrogen capacity as seen in FIG. 1. A wide range of water concentrations may be present in the feed air to a portable oxygen concentrator as the concentrator operates in a wide range of environmental conditions of temperature, altitude, and humidity levels. Therefore, any portable concentrator system must be designed for a wide range of feed gas contaminant levels.

A key parameter used to describe the operation of a PSA system is the superficial contact time of the gas in the adsorbent bed. This parameter is defined as $$t_{vo} = \frac{L}{v_o} \quad [1]$$

where L is the bed length and $v_o$ is the superficial velocity of the feed gas through the bed based on the empty bed volume. The superficial contact time may be defined for all adsorbent in the bed including a pretreatment layer, or alternatively may be defined for the pretreatment layer only. A minimum superficial contact time is required to select an adsorbent for contaminant removal.

Figure 2:
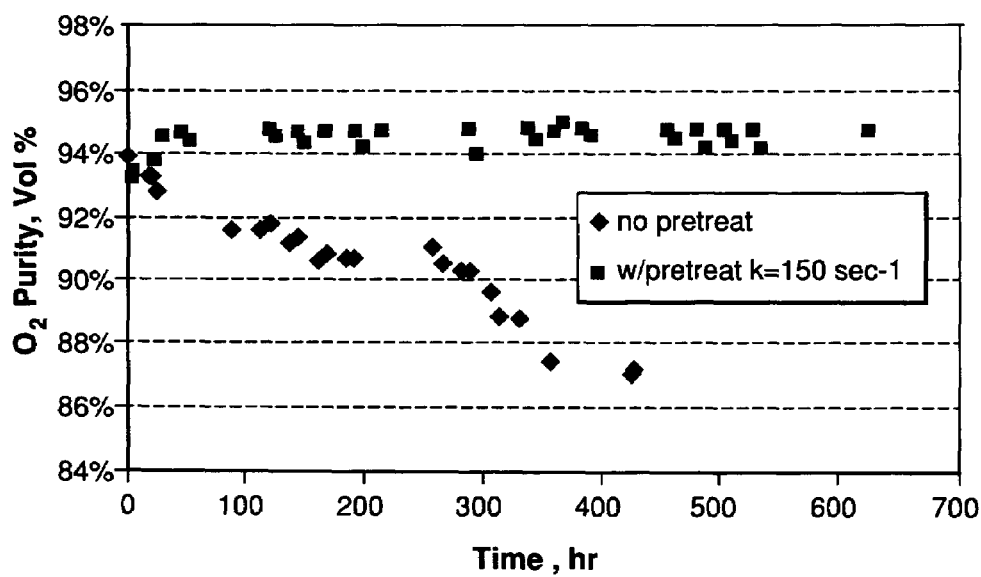
FIG. 2 is a plot of oxygen product purity vs. time for the operation of a single-bed PSA system using a bed of Oxysiv-MDX adsorbent with and without pretreatment for water removal.

Under typical ambient conditions (for example, 10-20% relative humidity in the ambient air feed), operating a zeolite bed without a pretreatment adsorbent in an oxygen PSA system will result in a noticeable decline in system performance in a short period of time. This was illustrated in an experiment carried out with a single-bed oxygen PVSA system using a full bed of a nitrogen-selective LiX adsorbent without a pretreatment layer. A single bed of UOP Oxysiv-MDX adsorbent was cycled in a four-step process (feed repressurization, feed/make product, evacuation, purge). The bed ID was 0.88 inch, the bed height was 2.47 inch, the total cycle time was 19 seconds, and the product rate was 43-48 sccm with a bed teed superficial velocity of about 0.38 ft sec$^{-1}$. The results of this experiment are given in FIG. 2, which is a plot of oxygen product purity vs. time over a period of 80,000 cycles. The decline in product purity over time due to lack of a pretreatment layer occurs almost immediately and continues nearly monotonically over the period of the experiment.

Process conditions for a typical portable oxygen concentrator design may include cycle differential pressures between about 0.4 atma and about 1.7 atma in PVSA and about 1 atma and about 6 atma in PSA processes. To achieve an oxygen recovery of 65% (i.e., the percentage of oxygen in the feed gas recovered as product), a feed flow rate in the range of about 2 slpm to about 40 slpm is required for the production of 0.25 to 5.0 slpm of 93% purity oxygen. The operating temperature of the oxygen concentrator typically is ~70° F., but can range from 0° F. to 100° F. depending on the location of the concentrator. Altitude can range from sea level to 6000 ft above sea level. Standard conditions are defined as 21.1° C. and 1 atm.

Figure 3:
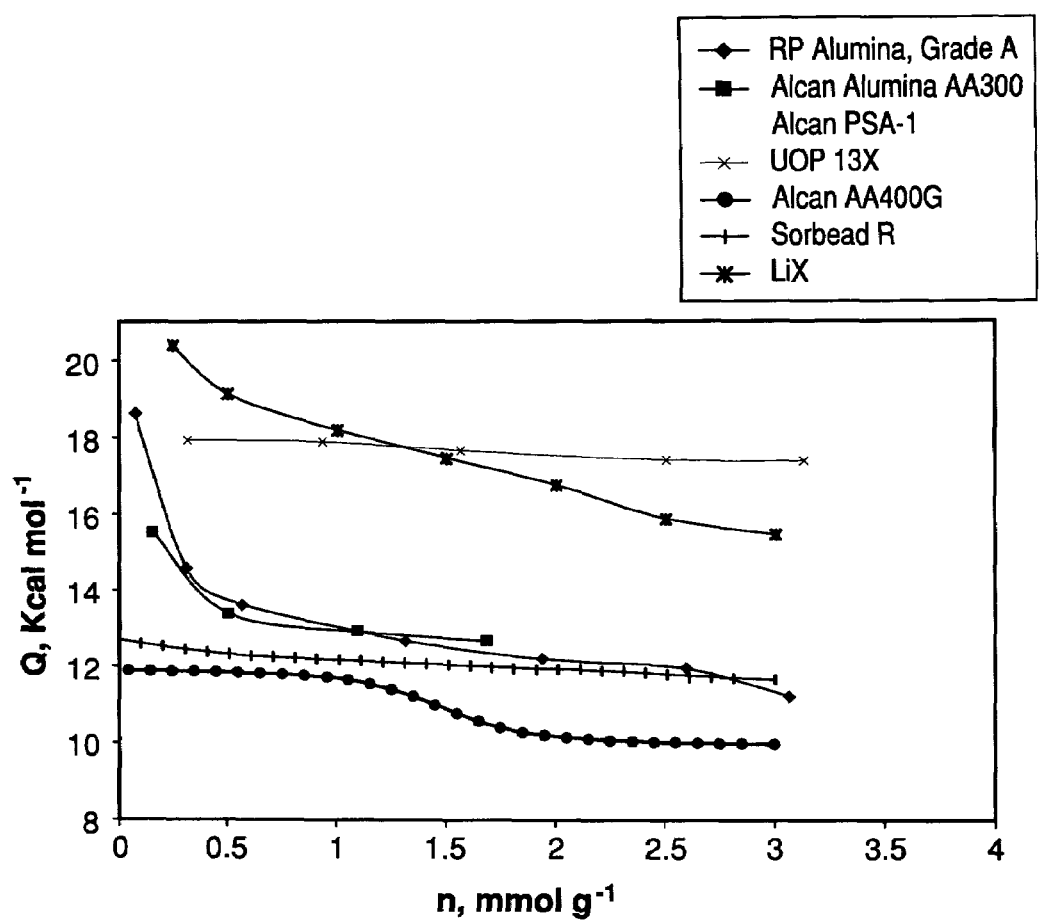
FIG. 3 is a plot of the heats of adsorption of water vs. water loading for various adsorbents.

For effective contaminant handling in the adsorber beds, a pretreatment adsorbent with favorable equilibrium properties and mass transfer properties is required. Various adsorbents are available to perform the task of reducing or removing the feed contaminants. FIG. 3 is a plot of the heats of adsorption of water vs. water loading for typical pretreatment adsorbents.

The adsorption kinetics of the pretreatment adsorbent and the nitrogen-selective zeolite can be quantified by a mass transfer coefficient, $k_i$, where k is the rate constant for sorbate i using an appropriate mass transfer model. This parameter can be determined by fitting experimental breakthrough or cycle data. Fitting cycle data accounts for a complete combination of all mechanisms of mass transfer resistance which are present in the actual process, and a more accurate model of the process kinetics is determined from mass transfer parameters obtained from cyclic data.

An experimental single-bed PSA apparatus was constructed for evaluating the mass transfer parameter for water adsorption on a given adsorbent. The apparatus was capable of experimental process operation in which the bed pressures and feed flow rates can be varied. To determine a representative mass transfer coefficient, k, the apparatus was operated at selected pressures and feed velocities to match those of an actual or planned full-scale process.

Figure 4:
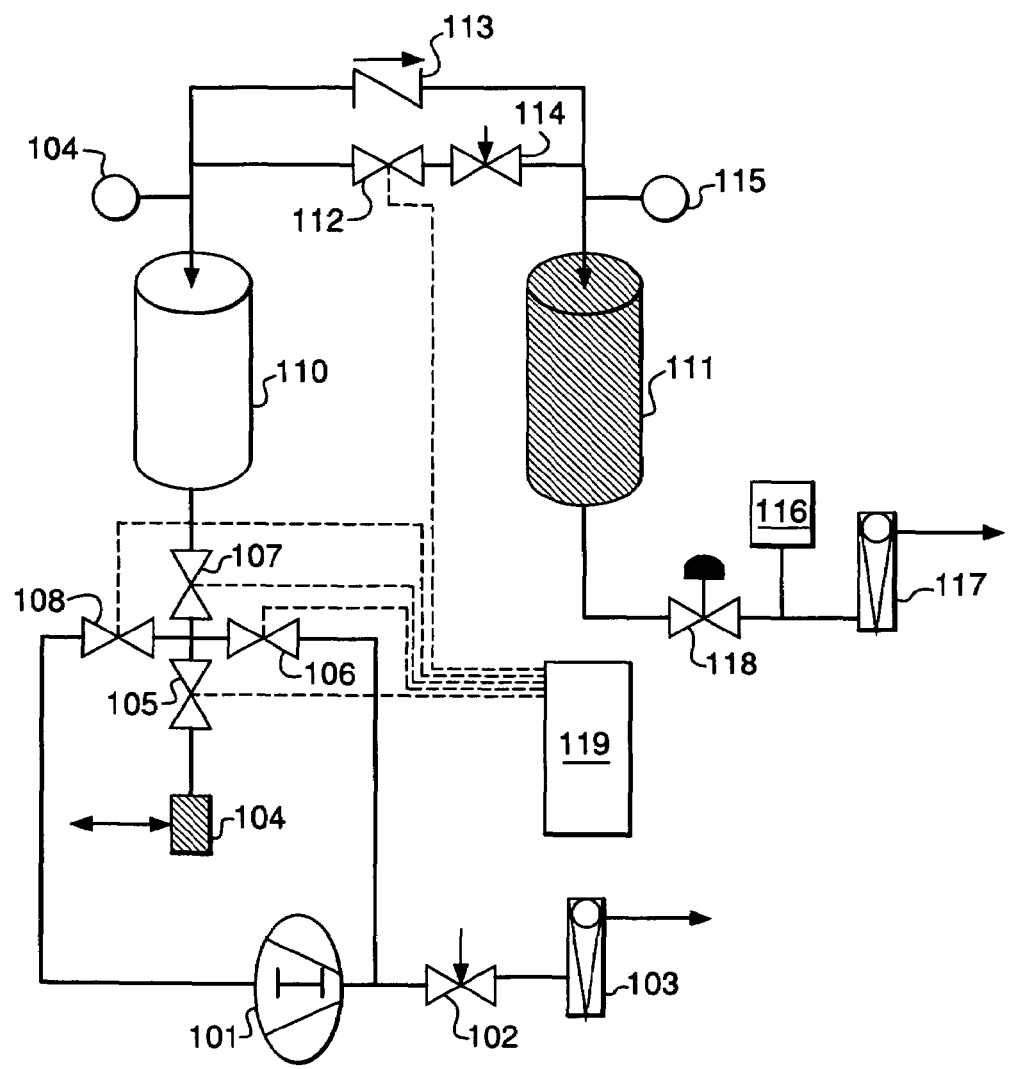
FIG. 4 is an illustration of a process test unit used to measure properties of adsorbent materials.

FIG. 4 is a schematic flow diagram of the single-bed experimental system. The test system comprised adsorber vessel 110 containing adsorbent, empty product tank 111, and air compressor 101 which provided air feed flow and also provided vacuum during evacuation. The air feed flow rate was adjusted by throttling a bleedoff flow through valve 102 and was measured by flow meter 103. Silencer/filter 104 was placed at the feed inlet/vacuum outlet. A block of pneumatic valves (105-108, 112) was operated in sequence by programmable logic controller 119. The duration of process steps in the PSA cycle was regulated by the programmable logic controller. Pressures were measured by pressure sensor 109 at the product end of the adsorber bed and by pressure sensor 115 at the inlet end of the product tank. Check valve 113 controlled the timing of the gas flow to product tank 111. The product flow was adjusted by needle valve 118, the oxygen purity was measured by para-magnetic oxygen analyzer 116, and flow rate was measured by flow meter 117. Feed gas temperature and humidity were measured at the feed inlet to the system. The system was located in an environmentally controlled laboratory.

A standard test procedure was used to evaluate the mass transfer characteristics of an adsorbent. The bed pressure was cycled from about 0.3 atm to about 1.2 atm, the oxygen product purity was maintained at 93%, and the feed and evacuation gas superficial velocities were about 0.39 ft sec$^{-1}$. It was necessary to change the cycle times slightly and to change the product flow rates to achieve these targets. The feed gas humidity, pressure, temperature, and flow rates were determined by direct measurement. The product flow rate and concentration were measured at cyclic steady state. Using all of the collected process data, a computer simulator model was developed to determine the mass transfer coefficient, k, for the tested adsorbent. This computer model, SIMPAC, is a process simulator which solves energy, mass, and momentum balances for a cycle having one or more adsorbent beds and a multicomponent feed gas. The process simulator can utilize a range of mass transfer and equilibrium models. The use and validation of SIMPAC is described in U.S. Pat. No. 5,258,060, which is incorporated herein by reference. In the selected mass transfer model, k is the rate constant from the well-known linear driving force model with partial pressure driving force:

$$\frac{\partial \bar{q}}{\partial t} = k_i(q^* - \bar{q}) \quad [2]$$

Where $\bar{q}$ is the average amount adsorbed in the pellet, $q^*$ is the equilibrium amount adsorbed per unit volume of adsorbent, and k is the mass transfer coefficient.

Single component isotherms were used to describe the equilibrium properties, axial dispersion was determined to be negligible, and a natural convection heat-transfer model was used in the non-isothermal energy balance. In determining the mass transfer behavior of water adsorption on the identified materials, a bed having two adsorbent layers was used. The first layer adsorbs only water and carbon dioxide, while the second layer has affinity for all of the components in the feed gas. The second layer is a well-characterized material for which all of the pure component isotherms and the mass transfer coefficients are known. In addition to the cyclic experiments, the materials were removed from the adsorbent columns in well-maintained sections after the experiments were complete and were analyzed for water content by thermogravimetric analysis (TGA) or preferably thermogravimetric analysis with infrared detection (TGA-IR) of the desorbing gas. A profile of the adsorbed water was obtained from this direct measurement and was matched to the computer simulation results. The k parameter was therefore determined.

Alcan AA-300 and AA-400 and UOP aluminas were screened to various particle sizes and tested using the procedure described above. Bed heights were between 2.4 and 3.2 inch, and inside bed diameters were 0.88 inch. The pretreatment bed height was 1 cm and feed linear velocities were about 0.4 ft sec$^{-1}$. As described above, mass transfer parameters determined for these materials are shown in Table 1.

TABLE 1

Approximate k values for water on pretreatment aluminas

| Adsorbent | $k_{water}$, sec$^{-1}$ |
|---|---|
| Alcan AA300, Activated, 14 × 20 mesh | 30 |
| Alcan AA400G, Activated, 20 × 28 mesh | 125 |
| Alcan AA400G, Activated, 28 × 48 mesh | 190 |
| Alcan AA400G, Activated, 32 × 35 mesh | 200 |
| UOP, Activated, 12 × 32 mesh | 105 |

The single bed experiments were extended to determine the overall effect of the pretreatment kinetic parameter on key properties of the process. Table 2 illustrates the impact of the pretreatment kinetics on the overall recovery and bed size factor (BSF). Adsorbents used in the main portion of the adsorbent bed are UOP Oxysiv MDX, UOP Oxysiv-7 and pilot scale LiLSX materials. This comparison of performance in systems having the same main bed adsorbent shows distinguishable differences where a pretreatment material having high k values are used. For example, we can compare case 1 with case 7 where the same Oxysiv-MDX is used and the bed split is 30/70. By using a pretreatment material having a larger k value (200 sec$^{-1}$ versus 30 sec$^{-1}$), the recovery improves from 29% to 45% and the bed size factor in case 7 is 73% of that in case 1.

TABLE 2

Effect of pretreatment adsorbent on overall performance of a single-bed VPSA process

| Case | Main Bed Sieve | Pretreat:Main Bed Ratio | Total Bed h, in | $k_{water}$, sec$^{-1}$ | O2 Recovery, % | Norm BSF, lb/TPDc |
|---|---|---|---|---|---|---|
| 1 | Oxysiv-MDX | 30/70 | 3.1 | 30 | 29% | 1.00 |
| 2 | Pilot LiLSX | 10/90 | 2.6 | 30 | 15% | 1.54 |
| 3 | Oxysiv-7 | 30/70 | 3.2 | 125 | 22% | 1.36 |
| 4 | Pilot LiLSX | 10/90 | 2.6 | 125 | 26% | 1.29 |

TABLE 2-continued

Effect of pretreatment adsorbent on overall performance of a single-bed VPSA process

| Case | Main Bed Sieve | Pretreat:Main Bed Ratio | Total Bed h, in | $k_{water}$, sec$^{-1}$ | O2 Recovery, % | Norm BSF, lb/TPDc |
|---|---|---|---|---|---|---|
| 5 | Oxysiv-MDX | 30/70 | 3.2 | 125 | 41% | 0.97 |
| 6 | Oxysiv-MDX | 25/75 | 3.2 | 190 | 56% | 0.74 |
| 7 | Oxysiv-MDX | 30/70 | 3.2 | 200 | 45% | 0.73 |
| 8 | Oxysiv-MDX | 25/75 | 3.2 | 105 | 50% | 0.67 |

Example 1

The mass transfer properties of the pretreatment adsorbent were also used to predict the performance of a four-bed process previously described in patent application EP1598103A2 where cycle times were 6.0-8.0 seconds and individual step times were 0.75 to 1.0 seconds. This four bed process was run both in simulation and experimentally to illustrate the previously unrecognized relationship between the contaminant kinetics in the pretreatment layer and the overall product recovery and bed size factor in a portable system. Table 3 summarizes these experimental results.

TABLE 3

Effect of pretreatment adsorbent on overall performance of 4-bed VPSA process

| 4-Bed Experiment | Main Bed Sieve | Pre:Main Bed Ratio | $k_{water}$, sec$^{-1}$ | Production at 93% O2, slpm | Recovery, % | BSF, lb/TPDc |
|---|---|---|---|---|---|---|
| BB326 | Oxysiv-MDX | 30/70 | 125 | 3.1 | 66% | 156 |
| PB334 | Oxysiv-MDX | 25/75 | 190 | 3.2 | 65% | 147 |

In the fast cycle process, the amount of water removed in the pretreatment layer strongly influences the effectiveness of the nitrogen removal since part of the main bed adsorbent becomes irreversibly contaminated. Minimizing this main bed contamination is important in maintaining the desired performance. As stated earlier, both capacity and adsorption kinetics are important in the removal of water from the feed gas. The pretreatment adsorbent must have a fairly low activation energy (heat of adsorption) and high adsorption kinetics. Since the heat of adsorption for water on any adsorbent is not negligible, the thermal profile within the adsorbent bed becomes a contributing factor in the effectiveness of the contaminant removal and regeneration. In systems where water has a low heat of desorption relative to the nitrogen selective adsorbent in the main adsorbent bed, it is beneficial to run the system at near-isothermal conditions.

While no process can be run as purely isothermal, a system at near-isothermal conditions is defined as a system where there is a high degree of heat transfer from the adsorption process to the ambient surroundings. As shown in prior art, for various reasons a temperature effect described as a "cold zone" is observed near the interface of layered beds where the temperature profile of the beds dips very low relative to the feed inlet temperature. With improved heat transfer, this temperature dip can be minimized. For example, the degree of heat transfer from the adsorbent bed to the column wall is described by a single heat transfer parameter, $h_w$, where it is shown that higher values of $h_w$ yield narrower bed temperature profiles. A large drop in bed temperature causes a higher energy requirement for regeneration of the zone where the "dip" occurs. In small portable adsorption systems, increased vacuum energy is costly in the form of increased compressor capacity and hence higher power and weight.

Figure 5:
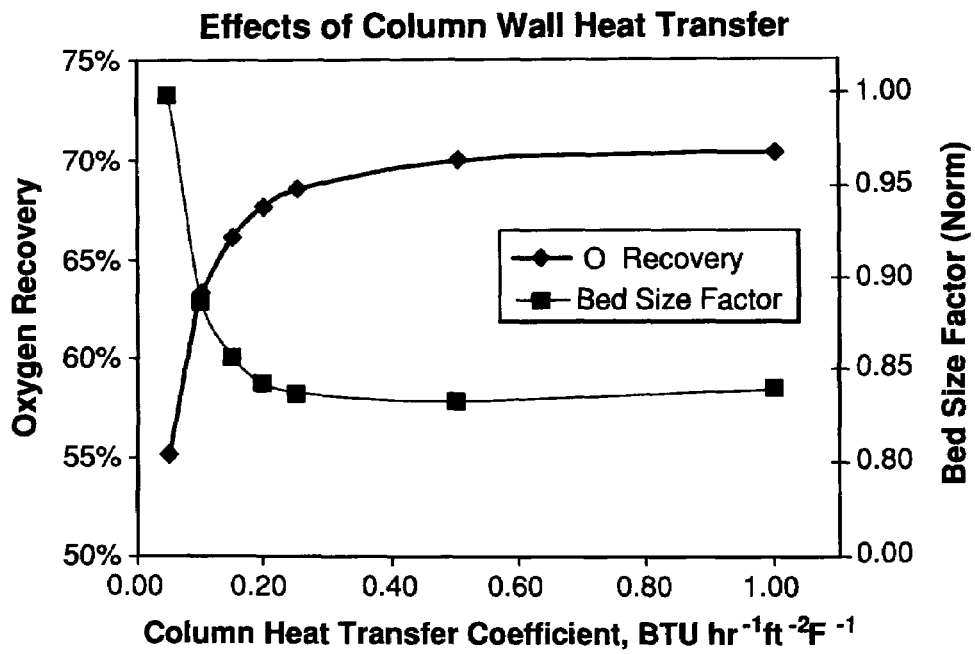
FIG. 5 is a plot of oxygen recovery and bed size factor vs. heat transfer coefficient for a four-bed PVSA process with pretreatment for water removal.

A solution to this problem is to use a layered adsorbent bed wherein the energy required to regenerate the pretreatment adsorbent is minimized and wherein the heats of adsorption and regeneration are easily transferred from or to the adsorbent bed. The effects of this improvement are shown in FIG. 5 and Table 4 which illustrate the performance of the previously described 4-bed system where the overall product recovery and bed size factor are shown to have a dependence on the $h_w$.

Pressure drop effects are important in selecting and optimizing a pretreatment adsorbent. Since smaller particles will have better mass transfer properties and higher k values, they are preferred in rapid cycle systems. As adsorbent particles are decreased in size, however, there are significant issues with pressure drop and handling which make particles below a certain size unfeasible in packed beds.

Example 2

Simulations were made using the 4-bed process described in Example 1. Ambient conditions of 1 atm, 73° F., and 25% relative humidity were assumed. Beds of Alcan AA400G alumina pretreatment layer with highly exchanged LiLSX main bed layer were used in a 25/75 ratio (pretreatment layer/main layer). The total cycle time was 8 seconds and a heat transfer coefficient of 0.87 BTU lb$^{-1}$hr$^{-1}$° F.$^{-1}$ was used. The simulations were made for various values of the pretreatment adsorbent particle size and water mass transfer coefficient, $k_w$. The value of $k_w$ was varied according to the relation $$k_w \propto \frac{D_{eff}}{R_p^2} \quad [3]$$

where the effective diffusivity, $D_{eff}$, was assumed to be constant for all particle sizes. Specific adiabatic power was determined for each case for comparison.

Figure 6:
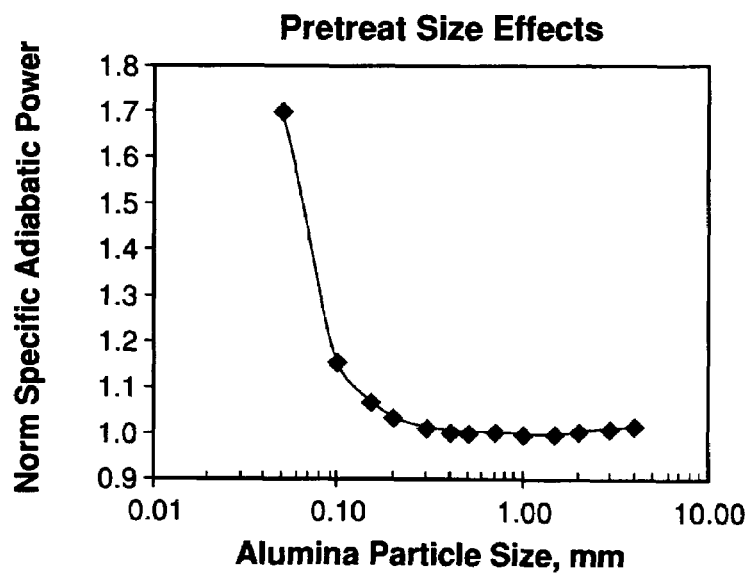
FIG. 6 is a plot of the effects of pretreatment adsorbent particle size on normalized adiabatic power.

The results are presented in FIG. 6, which shows the product recovery effects of using small bead particles with increased pressure drop and a sharp increase in power where smaller particle sizes are used. An operating issue not captured in the operating data of FIG. 6 is the generation of fines from rubbing particles, which occurs because the energy required to move and vibrate the small particles is lower than that for larger particles, therefore increasing the likelihood of attrition of smaller particles. Such fines and dust can cause clogging and malfunction of downstream system components, particularly valves. Another issue is increased mass transfer resistance due to adsorbed film effects on smaller particles.

TABLE 4

Effects of Heat Transfer on 4-Bed process (constant k)

| Case | Pretreat:Main Bed Ratio | HTC, BTU lb$^{-1}$ hr$^{-1}$ F$^{-1}$ | O2 Recovery, % | Norm BSF, lb/TPDc |
|---|---|---|---|---|
| 9 | 25:75 | 0.05 | 55% | 1.00 |
| 10 | 25:75 | 0.10 | 63% | 0.89 |
| 11 | 25:75 | 0.15 | 66% | 0.86 |
| 12 | 25:75 | 0.20 | 68% | 0.84 |
| 13 | 25:75 | 0.25 | 69% | 0.84 |
| 14 | 25:75 | 0.50 | 70% | 0.83 |
| 15 | 25:75 | 1.00 | 70% | 0.84 |

Example 3

A single bed experiment was run using a 4-step process analogous the process described above. The adsorbent column was loaded with LiLSX having an average particle diameter of 0.8 mm and an Alcoa AL H152 pretreatment adsorbent with an average particle diameter of 2.0 mm. The cycle time was varied from 85-105 seconds with feed time varied between 25 and 45 seconds. The feed linear velocity ranged from 0.2 to 0.4 ft/sec. The adsorbent column length was 17 inches and 30% of the total length was the pretreatment layer. Oxygen product purity was 90% and remained steady for about 300 hours before the experiment was completed. The column heat transfer coefficient (HTC) was about 0.15 BTU lb$^{-1}$hr$^{-1\circ}$ F.$^{-1}$.

The invention claimed is:

1. A pressure swing adsorption process for the production of oxygen comprising
    (a) providing at least one adsorber vessel having a feed end and a product end, wherein the vessel comprises a first layer of adsorbent material adjacent the feed end and a second layer of adsorbent material disposed between the first layer and the product end, wherein the adsorbent in the first layer is selective for the adsorption of water from a mixture comprising water, oxygen, and nitrogen and the adsorbent in the second layer is selective for the adsorption of nitrogen from a mixture comprising oxygen and nitrogen, and wherein the heat of adsorption of water on the adsorbent material in the first layer is equal to or less than about 14 kcal/mole at loadings equal to or greater than about 0.05 to about 3 mmol adsorbed water per gram of adsorbent;
    (b) introducing a pressurized feed gas comprising at least oxygen, nitrogen, and water into the feed end of the adsorber vessel, passing the gas successively through the first and second layers, adsorbing at least a portion of the water in the adsorbent material in the first layer, and adsorbing at least a portion of the nitrogen in the adsorbent material in the second layer, wherein the mass transfer coefficient of water in the first layer of adsorbent material is in the range of about 125 to about 400 sec$^{-1}$ and the superficial contact time of the pressurized feed gas in the first layer is between about 0.08 and about 0.50 sec; and
    (c) withdrawing a product gas enriched in oxygen from the product end of the adsorber vessel.

2. The process of claim 1 wherein the adsorbent material in the first layer comprises activated alumina.

3. The process of claim 2 wherein the activated alumina has an average particle diameter between about 0.3 mm and about 0.7 mm.

4. The process of claim 1 wherein the adsorbent material in the second layer is selective for the adsorption of argon from a mixture comprising argon and oxygen.

5. The process of claim 1 wherein the depth of the first layer is between about 10% and about 40% of the total depth of the first and second layers.

6. The process of claim 5 wherein the adsorber vessel is cylindrical and the ratio of the total depth of the first and second layers to the inside diameter of the adsorber vessel is between about 1.8 and about 6.0.

7. The process of claim 1 wherein the pressure swing adsorption process is operated in a repeating cycle comprising at least a feed step wherein the pressurized feed gas is introduced into the feed end of the adsorber vessel and the product gas enriched in oxygen is withdrawn from the product end of the adsorber vessel, a depressurization step in which gas is withdrawn from the feed end of the adsorber vessel to regenerate the adsorbent material in the first and second layers, and a repressurization step in which the adsorber vessel is pressurized by introducing one or more repressurization gases into the adsorber vessel, and wherein the duration of the feed step is between about 0.75 and about 45 seconds.

8. The process of claim 7 wherein the total duration of the cycle is between about 6 and about 100 seconds.

9. The process of claim 1 wherein the flow rate of the product gas enriched in oxygen is between about 0.1 and about 3.0 standard liters per minute.

10. The method of claim 9 wherein the ratio of the weight in grams of the adsorbent material in the first layer to the flow rate of the product gas in standard liters per minute at 93% oxygen purity in the product gas is less than about 50 g/slpm.

11. The process of claim 1 wherein the adsorbent material in the second layer comprises one or more adsorbents selected from the group consisting of X-type zeolite, A-type zeolite, Y-type zeolite, chabazite, mordenite, and clinoptilolite.

12. The process of claim 11 wherein the adsorbent material is a lithium-exchanged low silica X-type zeolite in which at least about 85% of the active site cations are lithium.

13. The process of claim 1 wherein the pressurized feed gas is air.

14. The process of claim 1 wherein the concentration of oxygen in the product gas withdrawn from the product end of the adsorber vessel is at least 85 volume %.

15. The process of claim 5 wherein the depth of the first layer is between about 0.7 and about 13 cm.

16. The process of claim 1 wherein the amount of oxygen recovered in the product gas at 93% oxygen purity in the product gas is greater than about 35% of the amount of oxygen in the pressurized feed gas.

17. A pressure swing adsorption process for the production of oxygen comprising
    (a) providing at least one adsorber vessel having a feed end and a product end, wherein the vessel comprises a first layer of adsorbent material adjacent the feed end and a second layer of adsorbent material disposed between the first layer and the product end, wherein the adsorbent in the first layer is selective for the adsorption of water from a mixture comprising water, oxygen, and nitrogen and the adsorbent in the second layer is selective for the adsorption of nitrogen from a mixture comprising oxygen and nitrogen, wherein the heat of adsorption of water on the adsorbent material in the first layer is equal to or less than about 14 kcal/mole at loadings equal to or greater than about 0.05 to about 3 mmol adsorbed water per gram of adsorbent;

(b) introducing a pressurized feed gas comprising at least oxygen, nitrogen, and water into the feed end of the adsorber vessel, passing the gas successively through the first and second layers, adsorbing at least a portion of the water in the adsorbent material in the first layer, and adsorbing at least a portion of the nitrogen in the adsorbent material in the second layer, wherein the mass transfer coefficient of water in the first layer of adsorbent material is in the range of about 125 to about 400 $sec^{-1}$; and (c) withdrawing a product gas enriched in oxygen from the product end of the adsorber vessel, wherein the ratio of the weight in grams of the adsorbent material in the first layer to the flow rate of the product gas in standard liters per minute at 93% oxygen purity in the product gas is less than about 50 g/slpm.

18. The process of claim 17 wherein the adsorbent material in the first layer comprises activated alumina.

19. The process of claim 18 wherein the activated alumina has an average particle diameter between about 0.3 mm and about 0.7 mm.

20. The process of claim 17 wherein the adsorbent material in the second layer is selective for the adsorption of argon from a mixture comprising argon and oxygen.

21. The process of claim 17 wherein the depth of the first layer is between about 10% and about 40% of the total depth of the first and second layers.

22. The process of claim 21 wherein the adsorber vessel is cylindrical and the ratio of the total depth of the first and second layers to the inside diameter of the adsorber vessel is between about 1.8 and about 6.0.

23. The process of claim 17 wherein the pressure swing adsorption process is operated in a repeating cycle comprising at least a feed step wherein the pressurized feed gas is introduced into the feed end of the adsorber vessel and the product gas enriched in oxygen is withdrawn from the product end of the adsorber vessel, a depressurization step in which gas is withdrawn from the feed end of the adsorber vessel to regenerate the adsorbent material in the first and second layers, and a repressurization step in which the adsorber vessel is pressurized by introducing one or more repressurization gases into the adsorber vessel, and wherein the duration of the feed step is between about 0.75 and about 45 seconds.

24. The process of claim 23 wherein the total duration of the cycle is between about 6 and about 100 seconds.

25. The process of claim 17 wherein the flow rate of the product gas enriched in oxygen is between about 0.1 and about 3.0 standard liters per minute.

26. The process of claim 17 wherein the adsorbent material in the second layer comprises one or more adsorbents selected from the group consisting of X-type zeolite, A-type zeolite, Y-type zeolite, chabazite, mordenite, and clinoptilolite.

27. The process of claim 26 wherein the adsorbent material is a lithium-exchanged low silica X-type zeolite in which at least about 85% of the active site cations are lithium.

28. The process of claim 17 wherein the pressurized feed gas is air.

29. The process of claim 17 wherein the concentration of oxygen in the product gas withdrawn from the product end of the adsorber vessel is at least 93 volume %.

30. The process of claim 21 wherein the depth of the first layer is between about 0.7 and about 13 cm.

31. The process of claim 17 wherein the amount of oxygen recovered in the product gas at 93% oxygen purity in the product is greater than about 35% of the amount of oxygen in the pressurized feed gas.

* * * * *